July 16, 1929.  A. M. KAMPER  1,721,123
CHANGE SPEED GEAR
Filed Oct. 10, 1928  3 Sheets-Sheet 1

INVENTOR
A.M.KAMPER

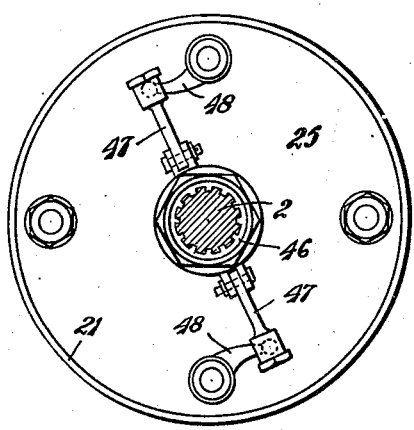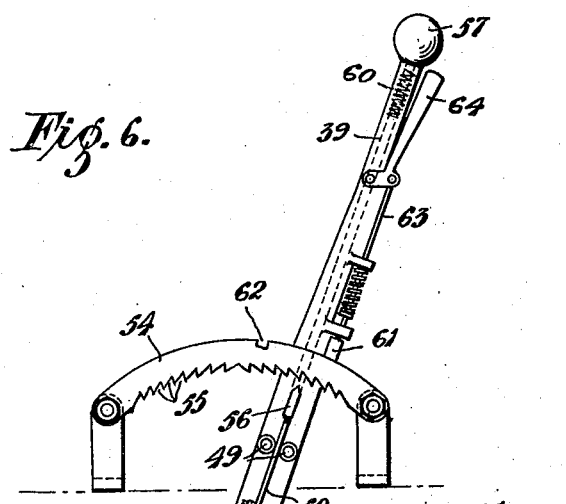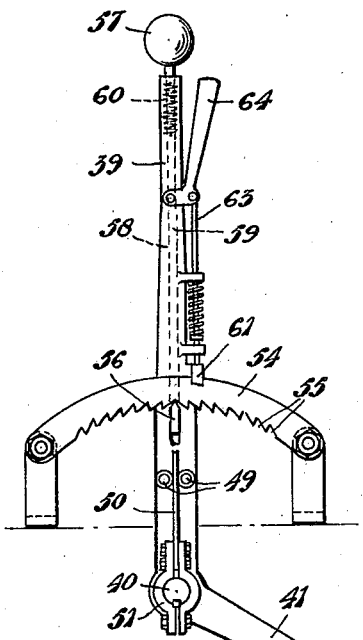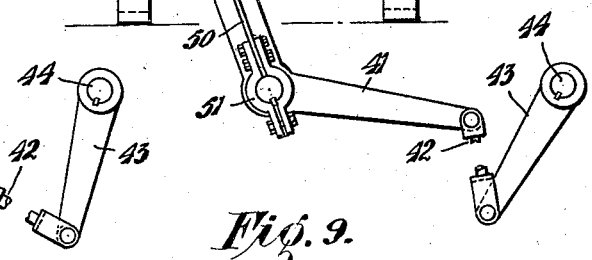

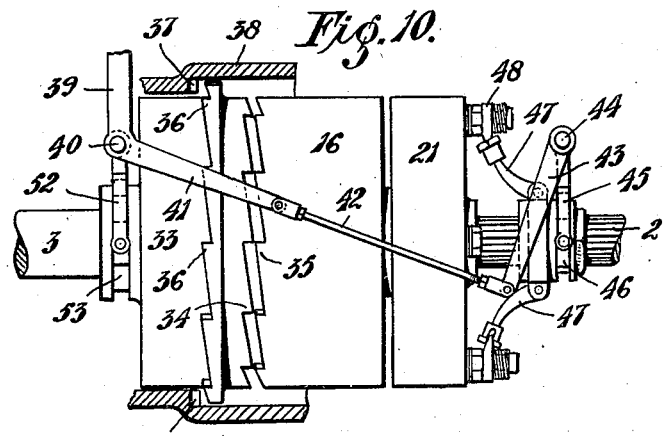
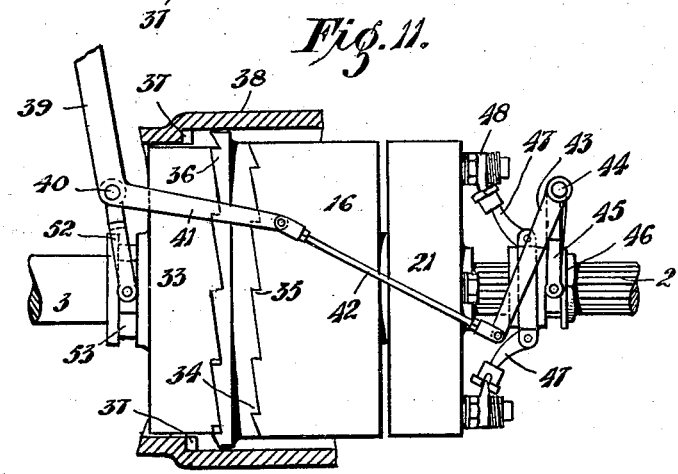
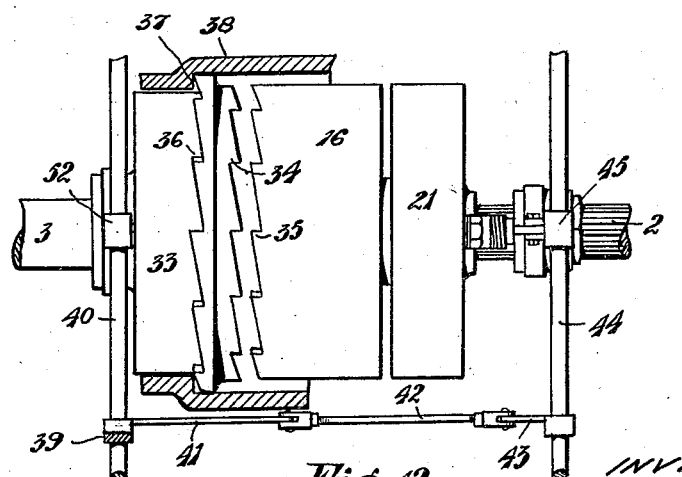

Patented July 16, 1929.

1,721,123

UNITED STATES PATENT OFFICE.

ANDREW MATHIS KAMPER, OF HALLSTON, VIA YARRAGON, VICTORIA, AUSTRALIA.

CHANGE-SPEED GEAR.

Application filed October 10, 1928, Serial No. 311,623, and in Australia February 29, 1928.

This invention relates to an improved change speed gear adapted to provide an infinite number of changes of speed from zero to the speed of the prime mover, either forward or reverse.

The invention is usable with engines of all kinds but is particularly adaptable for use in connection with the engines of motor-vehicles. The change-speed gear is so designed as to enable a gradual change of speed to be obtained, and in some cases to automatically vary the speed and gear ratio proportional to the load imposed.

The improved change speed gear is based on the principle of the balance or differential gear and is composed of two essential parts, viz, balance gear to obtain speed variations and a transmission gear by which either a direct drive or a reverse drive is transmitted to the driven shaft.

In the accompanying exemplary drawings:—

Figure 1:
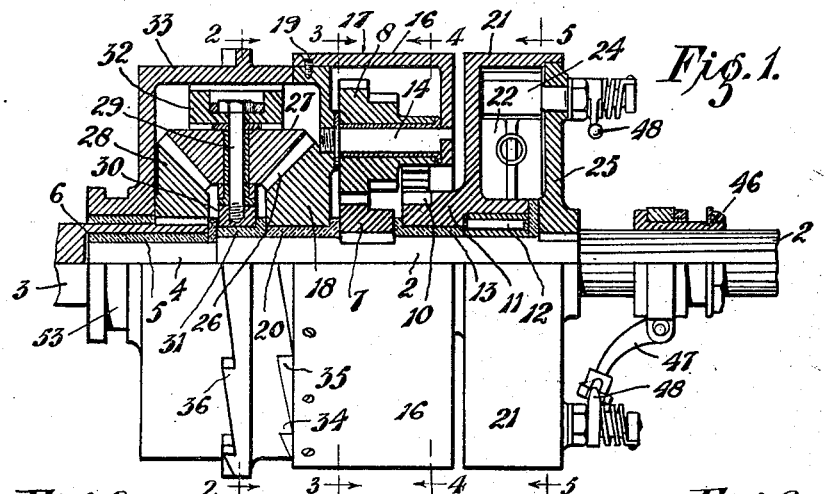
Figure 1 is a view partly in section of the improved change speed gear as constructed for use with a motor-vehicle engine.
Figure 3:
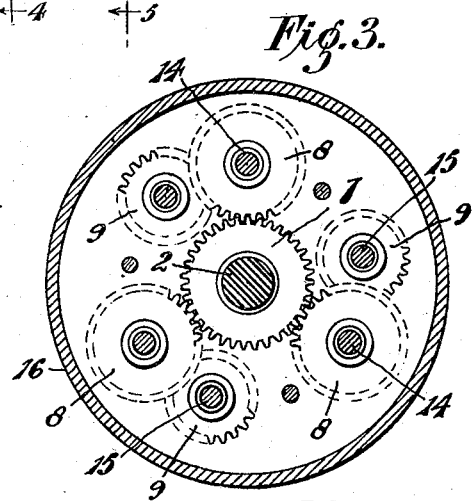
Figure 4:
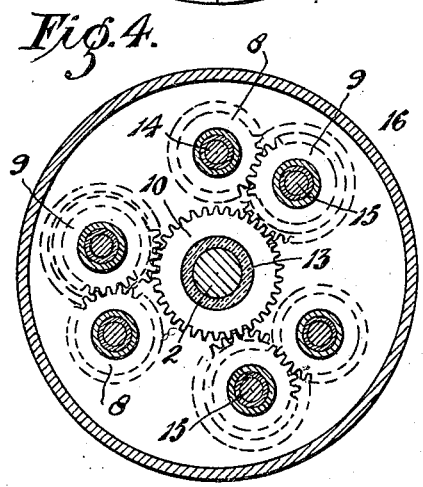

Figures 3 and 4 are sectional views on lines 3—3 and 4—4, respectively, of Figure 1.

Figure 5:
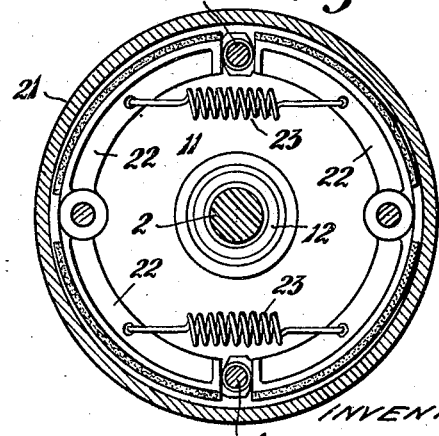

Figure 5 is a sectional view on line 5—5 of Figure 1.

Figure 6 is a detail view of the brake gear shown in Figure 5.

Figures 7, 8 and 9 are views illustrating three positions of the control lever.

Figure 10 is a sectional elevation showing the change speed gear in neutral position.

Figure 11 is a similar view showing the position of the gear for a forward drive.

Figure 12 is a sectional plan illustrating the gear in position for reverse drive.

In these views, 2 indicates the driving shaft from the engine crankshaft and 3 the driven shaft which may be connected in the usual manner to the rear driving wheels of the vehicle. The rear end 4 of the driving shaft 2 is preferably reduced in diameter and is freely rotatable within a bearing sleeve 5 fitted into the tubular end 6 of the driven shaft 3.

Rigidly keyed on the shaft 2 is a spur gear 7 meshing with three pinions 8 of stepped construction. Said pinions 8 are in mesh with other pinions 9 also of stepped construction which in turn mesh with a spur gear 10, see Figures 3 and 4. The spur gear 10 is formed integrally on a wheel 11 which is freely supported on the shaft 2 by means of a roller bearing 12 and bearing sleeve 13. The pinions 8 and 9 are loosely mounted on spindles 14 and 15, which at their ends are rigidly supported in a balance wheel 16. This balance wheel comprises an outer section 17 and an inner section 18 rigidly secured together as by screws 19. The inner section 18 is freely supported from the shaft 2 by means of a bearing bush 20.

The wheel 11 has an integrally formed drum 21 against which a gripping band is arranged to act. The clutch thus formed may be of any suitable type. I have shown an internal expanding band of conventional character comprising pivoted shoes 22 normally maintained contracted by coiled springs 23, and rotatable cams 24 for expanding said shoes against the drum 21. The shoes 22 are supported by a disc plate 25, which is keyed, splined or otherwise rigidly secured to the shaft 2 so that the gear is rotated in the same direction and at the same speed as said shaft 2.

The inner section 18 of the balance wheel 16 is constructed having a bevel wheel 26 meshing with three bevel reversing pinions 27 arranged radially around the shaft 2. These bevel pinions 27 mesh with a bevel wheel 28 which is rigidly keyed onto the tubular end 6 of the driven shaft 3.

Figure 2:
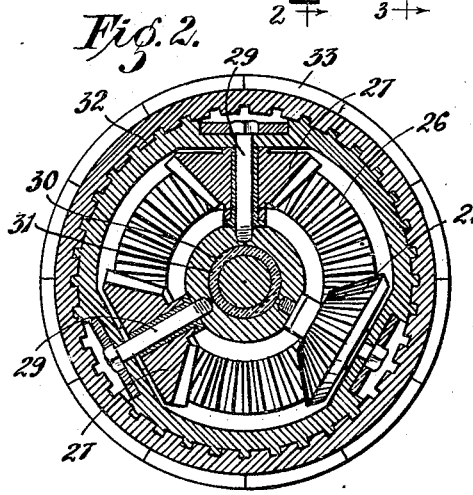
Figure 2 is a section on line 2—2 of Figure 1.

The bevel reversing pinions 27 are loosely mounted on spindles 29, which at their inner ends are screwed into a ring 30 freely mounted on the shaft 2 by means of a bearing sleeve 31. The outer ends of said spindles 29 are supported by an outer ring 32, which is castellated on its outer surface to engage a slidable drum 33, see Figure 2. This drum is freely mounted on the tubular end 6 of the shaft 3 and can be slidably moved therealong by means hereinafter described.

Formed on the edge of the sliding drum 33 are teeth 34 adapted to engage teeth 35 on the balance wheel 16 whereby said balance wheel and the sliding drum can be locked together for forward drive. The slidable drum is also formed having other teeth 36 which are adapted to engage teeth 37 on a stationary casing or mantle 38 whereby said drum can be locked against rotation during reverse drive.

The operation of the improved change speed gear is as follows:—

The shaft 2 is rotated from the crankshaft or power shaft of the engine and through the spur gear 7 it drives the pinions 8. These pinions drive the meshing pinions 9, which in turn, rotate the spur gear 10. The wheel 11 with its integrally formed drum 21 is thereby rotated in the reverse direction to the shaft 2 and to the gear, which latter is being rotated by the supporting disc plate 25 on said shaft 2.

If the band is not expanded, the wheel 11 will be freely rotated in reverse direction to the shaft 2 through the pinions 8—9 and the balance wheel 16 will remain stationary so that no drive is transmitted to the shaft 3. If the rotation of the wheel 11 is retarded by the application of the band, the balance wheel 16 will commence to rotate in the same direction as the shaft 2, and its speed of rotation will vary according to the degree of pressure applied to the wheel 11 by the band.

If the clutch is actuated sufficiently to cause the wheel 11 to remain stationary, the balance wheel will then be rotated at a speed equal to half the speed of the shaft 2. If the clutch be fully applied so that the wheel 11 is locked to the clutch gear, said wheel 11 will then be rotated in the same direction as the shaft 2, and the balance wheel 16 will be rotated at the same speed as that of the shaft 2. The limits of variation of the speed of the balance wheel 16 are from zero to the speed of the shaft 2, and any intermediate speed value can be obtained by corresponding retardation of the wheel 11 through the variable application of the clutch. I have found that the rotary speed of the balance wheel 16 is equal to half the sum of the relative speeds of the spur gears 7 and 10 when said gears and the pinions 8 and 9 are equally ratioed.

When a forward drive is required to be transmitted to the shaft 3, the slidable drum 33 is moved forwardly to bring the teeth 34 on its edge into engagement with the teeth 35 on the balance wheel 16, see Figure 11. Said drum is thus rigidly locked to the balance wheel 16 and is rotated thereby. The bevel reversing pinions 27, which are carried from the drum 33, are thus locked in mesh with the bevel gears 26—28 and they cannot rotate on their spindles. A locked gear system is thus formed between the bevel pinions 27 and said gears 26—28 so that a direct forward drive takes place therethrough to the shaft 3.

To transmit a reverse drive to the shaft 3, the slidable drum 33 is moved rearwardly to bring its teeth 36 into engagement with the teeth 37 on the stationary casing or mantle 38, see Figure 12. Said slidable drum is thus locked against rotation, and the drive takes place through the bevel reversing pinions 27 which now rotate freely on the stationary spindles 29 and cause a reverse drive to be imparted to the shaft 3.

When the slidable drum 33 is moved to the position shown in Figure 10 so that its teeth 34 and 36 are both disengaged, the gear is in neutral. In this position, said slidable drum is loose on the shaft 3 and is freely rotated thereupon by the bevel gear 26 and pinions 27, but no drive takes place to said shaft 3 through the bevel gear 28.

Application of the clutch band to the wheel 11 is controlled by a lever 39, which is loosely pivoted on a transverse shaft 40. Said control lever has a forwardly extending arm 41 connected by a link 42 to a lever 43 rigidly mounted on a transverse shaft 44. Connected to said shaft is a fork 45, which engages a collar member 46 or the like splined on the driving shaft 2 so that it can be slidably moved therealong whilst being rotated by said driving shaft. The collar 46 is connected by links 47 to arms 48, which are connected to the rotatable cams 24 of the clutch gear.

When the control lever 39 is actuated to slidably move the collar 46 inwardly on the driving shaft 2, the cams 24 are rotated through the links 47, causing the shoes 22 to be expanded against the drum 21. The degree of pressure exerted by the clutch band is conveniently adjusted as is desired by the control lever 39, thus regulating the speed of the balance wheel 16.

The control lever 39 carries on one side two rollers 49 between which is gripped a spring bar 50. The lower end of this spring bar is rigidly secured to the transverse shaft 40 by a suitable clamp 51. A fork 52 is secured on said shaft 40 and it engages a grooved boss 53 formed on the end of the slidable drum 33.

When the control lever 39 is moved rearwardly, the spring bar 50 rotates the shaft 40 causing the fork 52 to slidably move the drum 33 to the forward driving position with its teeth 34 engaging the teeth 35 of the balance wheel 16. By moving the control lever 39 forwardly, the fork 52 is actuated to move the slidable drum 33 to the reverse driving position. The spring bar 50 provides a resilient connection which prevents straining or breaking of the gear when the control lever 39 is moved to the extreme positions, either forward or reverse.

It will be understood from Figures 7, 8 and 9 that the levers 41 and 43 are so arranged relatively to each other as to cause the clutch gear to be operated in the same direction when the control lever 39 is moved either rearwardly or forwardly. By this means, similar speed variations are obtained both in forward gear or reverse gear by moving the control lever either forwardly or rearwardly from its central neutral position.

To retain the control lever 39 in selected adjusted position, I provide a quadrant 54 having notches 55 in its lower edge to receive a pawl 56 slidably fitted in said control lever. This pawl is connected to a knob 57 or the like on the upper end of the control lever by a rod 58 which is slidable in a hole 59 formed axially in said control lever. A suitable spring 60 normally maintains the pawl in engagement with the quadrant notches.

When the control lever 39 is grasped, the knob 51 is depressed to thereby disengage the pawl 56 from the quadrant and permit said control lever to be actuated. Upon release of the knob 57 the spring 60 causes the pawl to automatically engage the notched portion of the quadrant and thus hold said control lever in its adjusted position.

To lock the control lever 39 at the neutral position, a spring catch 61 is provided to engage a notch 62 on the upper edge of the quadrant 54. This catch is connected by a rod 63 to a handle 64 pivoted near to the upper end of said control lever so that it can be conveniently released by the operator when grasping the knob 57. This catch 61 automatically locks the control lever when neutral position is reached and thus prevents said control lever from being moved directly from forward position into reverse, or vice versa.

The improved change-speed gear provides for an automatic change of speed suitable to the particular load. For example, when starting a motor-vehicle it is necessary to overcome the inertia of rest, and high starting torque is required. This is obtained by moving the control lever 39 either forwardly or rearwardly to apply sufficient pressure on the wheel 11 to obtain the desired speed of the balance wheel 16. When the motor-vehicle begins to move, the value of the torque required to maintain the vehicle in motion decreases and the resultant excess of pressure between the shoes 22 and the drum 21 causes further reduction of speed of the wheel 11. The speed of the balance wheel 16 thus increases accordingly and imparts a further increase of speed to the vehicle until top speed at the particular clutch adjustment is reached.

Similarly, changes of speed are automatically effected during the journey of the vehicle according to the load imposed. Thus, when ascending a hill the load on the shaft 3 may become sufficient to overcome the pressure between the shoes 22 and the drum 21, thereby increasing the speed of the wheel 11. The speed of the balance wheel 16 is thus correspondingly decreased whereby a torque suitable for the particular load is obtained.

In designing the improved change speed gear for use with motor cars and like vehicles, the spur gears 7 and 10 and pinions 8—9 would ordinarily be generated to provide a direct one-to-one speed from the driving shaft 2 to the driven shaft 3 when the clutch gear is fully applied, but for heavy duty motor-vehicles or for other uses the gears may be rotioed to obtain a higher value of speed of the wheel 11 so as to reduce twisting moment acting in the clutch gear.

It must be understood that the invention is not limited to the precise details of construction hereinbefore set forth, but such changes and alterations as fairly fall within the spirit and scope of my invention may be made.

What I do claim is:—

1. An improved variable speed gear comprising, in combination, a driving shaft and a driven shaft, a balance wheel, pinions carried by said balance wheel, a wheel driven from the driving shaft through said pinions, a clutch co-acting with said wheel, means for applying said clutch to variably retard the motion of said wheel whereby the balance wheel is caused to rotate at a speed corresponding to the degree of retardation of said wheel, a slidable drum, bevel pinions carried by said drum and meshing with bevel gears on the balance wheel and the driven shaft respectively, and means for slidably engaging the drum either with the balance wheel to provide a direct drive or with a stationary casing to provide a reverse drive through said bevel pinions.

2. An improved variable speed gear as claimed in claim 1, and wherein the slidable drum has teeth on one edge to engage teeth on the balance wheel, and other teeth adapted to engage teeth on a stationary casing.

3. An improved variable speed gear as claimed in claim 1, and wherein the slidable drum is actuated by a control lever which also applies the clutch so as to vary the speed of the balance wheel.

4. An improved variable speed gear comprising, in combination, a driving shaft and a driven shaft, a balance wheel connected to the driving shaft, pinions carried by said balance wheel, a wheel driven from the driving shaft, a means for driving the last mentioned wheel in a reverse direction to the driving shaft, a clutch co-acting with said wheel and driven in the same direction as that of the driving shaft, and means for variably applying the clutch to said wheel to vary its motion from its free speed to that of the clutch whereby the balance wheel is caused to rotate at a speed varying from zero to that of the driving shaft.

5. An improved variable speed gear as claimed in claim 4, and wherein the clutch is carried by a disc rigidly mounted on the driving shaft and a control lever is provided for adjustably applying said clutch.

6. An improved variable speed gear comprising, in combination, a driving shaft and a driven shaft, a balance wheel, pinions freely supported on spindles carried by said balance wheel, a wheel driven from the driving shaft through said pinions, a clutch intermediate the driving shaft and said wheel, means for variably clutching said wheel to vary its motion whereby the balance wheel is caused to rotate at a speed variable from zero to that of the driving shaft, a pinion drive from the balance wheel to the driven shaft, a slidable drum adapted for connection to the balance wheel to thus lock the pinion drive and provide a direct drive and also capable of being held stationary to thus provide a reverse drive, and a control lever for actuating said drum and for varying the pressure exerted by the clutch.

7. An improved variable speed gear comprising, in combination, a driving shaft and a driven shaft, a balance wheel, pinions freely supported on spindles carried by said balance wheel, a wheel driven from the driving shaft through said pinions, a clutch intermediate the driving shaft and said wheel, means for variably clutching said wheel to vary its motion whereby the balance wheel is caused to rotate at a speed variable from zero to that of the driving shaft, a slidable drum, bevel reversing pinions carried by said drum and meshing with bevel gears on the balance wheel and the driven shaft, a control lever for slidably engaging said drum either with the balance wheel to lock the pinions to provide a forward drive or with a stationary casing to provide a reverse drive through said pinions, means connecting said control lever to the clutch, and means for locking said control lever in set adjusted position.

8. In a variable change speed gear as claimed in claim 7, the construction wherein the slidable drum is castellated on its inner surface to engage a ring which supports the spindles of the reversing pinions.

9. In a variable change speed gear as claimed in claim 7, the construction wherein the control lever is loosely pivoted on a shaft connected to the slidable drum, and a spring rod is provided to resiliently connect said lever to said shaft.

10. An improved variable speed gear embodying in combination, a driving shaft, a driven shaft, a balance wheel connected to the driving shaft, gearing connecting the balance wheel with the driven shaft so that it may impart a forward or reverse drive, pinions carried by said balance wheel, a wheel driven from the driving shaft through said pinions, a clutch intermediate the driving shaft and said wheel and means for actuating said clutch whereby the balance wheel is caused to rotate at a speed corresponding to the degree of pressure exerted by the clutch.

In testimony whereof I affix my signature.

ANDREW MATHIS KAMPER.